Aug. 2, 1938.　　　F. J. WESTROPE ET AL　　　2,125,476
COWL CONSTRUCTION
Filed July 17, 1936　　　2 Sheets-Sheet 1
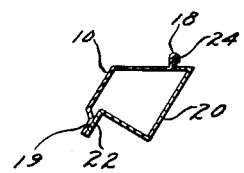
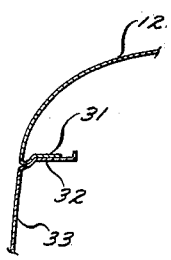
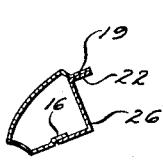
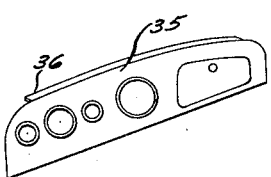
INVENTORS
FRED J. WESTROPE
ALFRED PERSON
BY
Harness Dickey Pierce & Haun
ATTORNEY.

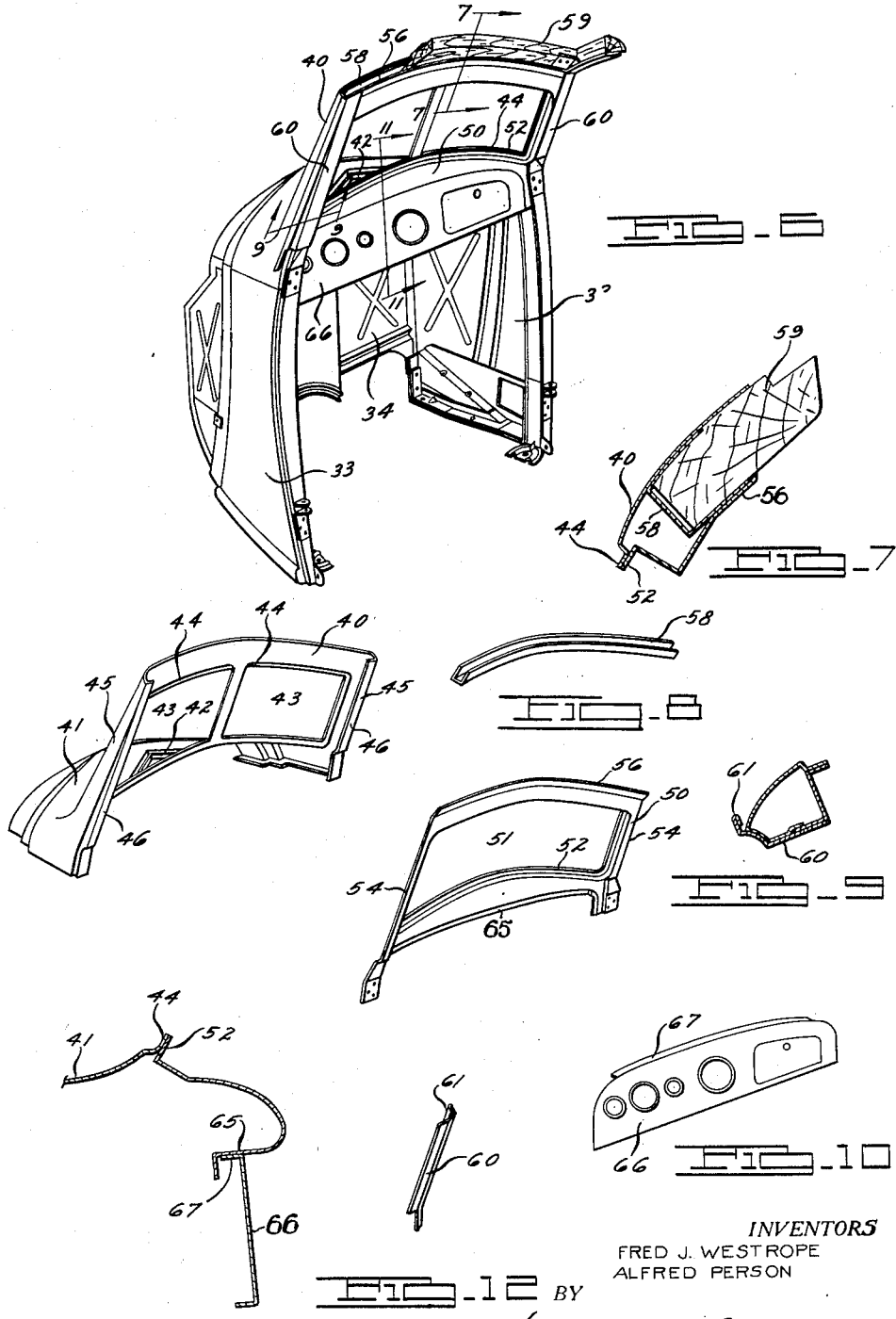

Patented Aug. 2, 1938

2,125,476

UNITED STATES PATENT OFFICE 2,125,476

COWL CONSTRUCTION

Fred J. Westrope and Alfred Person, Detroit, Mich., assignors to The Murray Corporation of America, a corporation of Delaware Application July 17, 1936, Serial No. 91,030

9 Claims. (Cl. 296—28)

The present invention relates to cowl and windshield framing constructions for automotive vehicles. More particularly it relates to a novel specific form of construction which is particularly adaptable for the type of automotive vehicles which have removably mounted or separately constructed tops associated therewith.

It is a primary object of the present invention to provide a cowl construction for automotive vehicles which is composed substantially entirely of metal parts. The present invention contemplates the provision of a windshield framing construction in which the front cowl member embodies the cowl top and windshield framing in mating relation with a rear windshield framing element, the mating sections together constituting a relatively strong, rigid structure defining windshield openings and pillar structures at the sides thereof.

A still further object of the present invention contemplates the provision of an improved cowl and windshield construction in which a pair of sheet metal stampings are mated together to provide a structure having inherent strength characteristics and at the same time provide a structure along the upper windshield header, which structure is preformed to provide for the reception of a separately constructed top thereon.

While numerous features of the present invention will find wide and practical utility in many and various kinds and types of cowl and windshield constructions, it will be appreciated that the specific form of the invention disclosed in this application is primarily directed to a type of windshield framing construction adapted for use in combination with vehicles having removable or convertible tops. In another form the present invention is particularly adaptable for association with a type of vehicle, such, for example, as a station wagon, in which a permanent top is associated with the windshield, and in which the windshield framing is provided with a particular specific construction adapted for the reception of such top.

A still further object of the present invention contemplates the provision of a windshield framing structure in which a pair of telescoping mating sections are positioned longitudinally with respect to each other in order that flanges on one of the sections mate with corresponding flanges on the opposite section to provide a structure of hollow box section at the sides of the windshield thus forming pillars of greatly increased strength.

The present invention contemplates the provision of a structure in which a flange on the inner windshield section mates with a corresponding flange on the outer windshield section, said flanges mating in the jam face of a door opening to provide greatly increased strength for the structure as a whole at this point.

Many other and further important advantages and features of novelty will become clearly apparent from the following specification when considered in connection with the accompanying drawings forming a part thereof.

In the drawings:

Figure 1 is a fragmentary perspective view of a structure embodying the improvements of the present invention showing the associated cowl side section and dashboard;

Fig. 2 is an enlarged sectional view taken substantially on the line 2—2 of Fig. 1 illustrating in detail the cross-sectional configuration of the upper windshield header formed in the improved construction;

Fig. 3 is an exploded view showing the outer cowl section, the inner cowl section and the instrument board associated therewith illustrating the manner in which these members are assembled in telescoping relation;

Fig. 4 is an enlarged fragmentary sectional view taken substantially on the line 4—4 of Fig. 1 illustrating in detail the manner in which the improved cowl nests with respect to the side cowl panels;

Fig. 5 is a transverse sectional view taken substantially on the line 5—5 of Fig. 1 illustrating in detail the cross-sectional construction and configuration of one of the pillars;

Fig. 6 is a fragmentary perspective view of a modified form of windshield construction illustrating the same assembled with the cowl side members and dashboard.

Fig. 7 is an enlarged sectional view taken substantially on the line 7—7 of Fig. 6 illustrating in detail the construction of the upper windshield header and the front bow of a top associated therewith;

Fig. 8 is a perspective view of the channel member which may be seated in the upper windshield header adapted to receive the front bow of the top construction;

Fig. 9 is a sectional view taken substantially on the line 9—9 of Fig. 6 illustrating in detail the cross-sectional configuration of one of the pillars and the manner in which a drip channel is formed thereon;

Fig. 10 is an exploded view similar to Fig. 3 illustrating this modified form of windshield framing construction and illustrating the manner in which the portions thereof are assembled in telescoping relation;

Fig. 11 is a sectional view taken substantially on the line 11—11 of Fig. 6 illustrating in detail the manner in which the inner and outer windshield framing elements mate with each other and the manner in which the instrument board is secured thereto;

Fig. 12 is a perspective view of the sheet metal member which provides the drip channel associated with each of the windshield pillars.

With more particular reference to the drawings and especially to the form of the invention shown in Figs. 1 to 5 thereof, it will be appreciated that the improved windshield framing construction comprises a sheet metal stamping 10 preformed to provide paneling surrounding and defining a pair of windshield openings 11 and providing a cowl top portion 12. As is conventional in constructions of this general character, the cowl top portion may be provided with a suitable aperture 13 therein for mounting the conventional cowl ventilator. While it will be appreciated that the windshield construction illustrated in the specific embodiment of the invention shown in the drawings, shows a type of windshield construction in which a pair of windshield openings are provided lying in different planes, it will be appreciated that the important features of the present invention may equally well be utilized in connection with a windshield framing element adapted to receive a single windshield pane. The cowl top 12 is provided with offsets 14 which serve to provide for mounting a conventional hood with respect to the cowl top and at the same time provide a flange for the attachment of the dashboard construction associated with the cowl.

The panel 10 is preformed to provide pillar portions at the lateral sides of the windshield opening 11, these pillar portions being reversely bent to provide portions 16 which lie in the plane of the jam face of a door opening, as well as providing lateral and forward reveal portions for the pillar structures. The upper marginal edge of the panel 10 is bent rearwardly to provide a portion of the upper surface of the header extending across the windshield top and the marginal edge of the panel at this point is bent upwardly to provide an upwardly directed flange 18 which extends entirely across the top of the upper header and projects upwardly therefrom. The marginal edges of the panel 10 within the windshield openings 11 are offset inwardly to provide flanges 19 lying substantially in the plane of the windshield opening.

The rear windshield frame element comprises a sheet metal stamping 20 having a windshield opening 21 therein approximately of the same size as the two windshield openings 11. The marginal edge of this panel 20 is preformed around the windshield opening 21 to provide a flange 22 lying substantially in the plane of the windshield openings 11, which flange is adapted to mate with the flange 19 along the top side of the windshield openings 11 and along the sides thereof adjacent the pillar portions of the windshield frame element 10. This inner or rear windshield frame element likewise has the flange surrounding the windshield openings therein along the bottom adapted to mate with the flange surrounding the windshield openings 11 in order that the inner and outer windshield frame elements may be secured together through these mating flanges and provide an inwardly projecting flange extending around three sides of each of the windshield openings 11, which flange, together with the paneling adjacent thereto, provides a rabbet for seating glass windshield panes within these openings. The upper marginal edge of the rear windshield framing element 20 is offset to provide a portion 23 adapted to form a portion of the upper surface of the windshield header and the extreme marginal edge of the framing element at this point is bent upwardly to provide an upwardly directed flange 24 adapted to mate with the upwardly directed flange 18 formed on the windshield framing element 10. As will be clearly seen by reference to Fig. 2, the flange 18 is slightly wider than the flange 24 and consequently, this flange 18 may be conveniently crimped over the flange 24 in order to lock the two windshield framing elements firmly in engagement with each other.

The lateral marginal edges of the stamping 20 are preformed to provide pillar portions 26 which mate with the pillar portions formed on the front windshield framing element. The lateral marginal edges of these pillar portions 26 mate with the offset flanges 16 on the pillar portions of the front windshield framing element, and it will, therefore, be seen that the front and rear windshield framing elements together provide pillar structures of hollow box section. Further it will be apparent that the front and rear windshield framing elements each have a portion thereof lying in the jam face of the door opening and that an overlapping relation between these two elements is established in substantially the central portion of the jam face of the door opening, consequently providing a strong reinforcement for the pillar structure at this point. Further it will be apparent that the upwardly extending flanges 18 and 24 which are crimped together to lock the members in assembled relationship provide an upwardly projecting ridge along the top of the windshield header which is adapted to fit in a complemental recess in the front bow of a convertible top in order to provide means for accurately positioning the top with respect to the upper windshield header.

As is conventional in constructions of this general character, it may be found convenient to provide additional means for securing the front bow of the top in assembled relation with the upper windshield header such as is conventional in the art.

The lower marginal edges of the stamping 10 are preformed to provide inwardly projecting flanges 31 which mate with suitable inwardly projecting flanges 32 on the upper marginal edges of the cowl side members 33. The cowl side members 33 may be substantially conventional in construction and are interconnected at their forward ends by means of a suitable dashboard 34. These cowl side members 33 have their rear marginal edges preformed to provide the lower portion of the jam face of the door opening, the upper portion of which is provided by the windshield pillar structure. An instrument panel 35 of conventional construction is provided, and this panel has at its upper marginal edge a forwardly projecting flange 36 which serves to mate with a complemental flange 37 formed on the rear windshield framing element in order that these two members may be secured together in unitary relation.

The overlapping flanges of the respective parts may be conveniently secured together by spot welding, such as is conventional in constructions of this general character.

It will be seen that in the assembly of the front and rear windshield framing elements the two members may be telescoped together longitudinally and the flanges 22 and 26 are so formed that they will inherently lie in mating relation with the flanges 19 and 16 respectively on the forward windshield framing element. The members may then be spot welded together through these mating flanges and the top flange 18 may be crimped over its complemental mating flange 24 in order to complete the assembly operation.

It will be seen that a structure of great inherent strength and rigidity is provided by the foregoing described construction and that this structure is simply fabricated and easily assembled.

In the modified form of the invention illustrated in Figs. 6 to 12, inclusive, the windshield framing structure shown therein is designed particularly for use in connection with a beach wagon or station wagon of the type in which a rigid composite wood and fabric top is associated permanently with the windshield structure. In this type of windshield construction it is essential to provide the upper windshield header of a construction which is adapted to receive and permanently mount the front wooden bow of the top to be associated with the vehicle. In order to accomplish this general result, a stamping 40 forming the front windshield framing element is provided. This stamping is preformed to provide a cowl top 41 with the conventional ventilator aperture 42 and has provided therein a pair of windshield openings 43 substantially identical to windshield openings 11 described above in connection with the preferred embodiment of the invention. As has been described above, the marginal edge of the panel defining the windshield opening 43 is offset inwardly to provide flanges 44 surrounding the windshield openings, which flanges lie substantially in the plane of the openings. The paneling is further preformed to provide pillar structures 45 at the lateral sides thereof, and these pillar portions 45 have the marginal edges thereof bent to provide flanges 46 forming portions of the surfaces of the jam faces of the front door openings. The rear windshield framing element 50 is substantially similar in construction to the windshield framing element 20 described in connection with the preferred embodiment of the invention and is provided with a windshield opening 51, the paneling surrounding this windshield opening being preformed to provide a flange 52 lying substantially in the plane of the opening and adapted to mate with the flanges 44 surrounding the windshield opening 43. The lateral edges of the stamping 50 are preformed to provide portions 54 which form a portion of the jam face surface of the front door opening, and it will be seen that the marginal edges of these pillar portions 54 are adapted to mate with the marginal flanges 46 at the lateral sides of the front windshield framing element 40.

The construction of the windshield framing elements in this modified form of the invention is substantially the same as that described in connection with the preferred embodiment of the invention shown in Figs. 1 to 5, inclusive, except for the structure of the windshield header. In this form, the marginal edge of the front windshield stamping 40 terminates in an edge substantially in the plane of the front windshield framing panel. The top marginal edge of the rear windshield framing element 50 terminates in a flange 56 which is inclined slightly rearwardly and is adapted to lie parallel in spaced relation to the upper marginal edge of the front windshield framing element panels. A channel element 58 is adapted to be disposed between these two panels to provide a reinforced windshield header structure above the windshield openings. One leg of the channel element 58 is adapted to mate with the upper marginal edge of the rear windshield framing panel and the other leg of the channel element 58 is adapted to mate with and be secured to the upper marginal edge of the front windshield framing panel 40. The manner in which this channel element 58 is mounted between the two panels is clearly seen in Fig. 7. This construction provides a reinforced header across the top of the windshield opening, which header provides an upwardly and rearwardly presenting channel adapted to receive a wooden bow member 59 which forms the front bow of the top associated with the vehicle as a whole. It will be readily appreciated that this channel provides a firm seat for this bow and a construction in which strong reinforcement exists over the front portion of the windshield opening.

A somewhat modified structure is provided in the jam face of the door opening in this form of the invention. A sheet metal finish member 60 is provided, which member is bent over upon itself in its marginal edge 61 to provide a neat, attractive finish for the marginal edge of the member. The body portion of the member 60 is bent to a configuration adapted to mate with one of the pillars at the side of the windshield opening, and has a portion thereof adapted to lie in and cover the entire upper portion of the jam face of the door opening. It will be appreciated that this member 60 not only provides an attractive finish for the jam face of the door opening which serves to hide the overlapping joint between the front and rear windshield framing elements, but also serves, by means of the projecting edge 61, to provide a downwardly extending drip channel at the lateral sides of the windshield opening and precludes the entrance of water to the interior of the body structure at this point.

The form of the invention disclosed in Figs. 6 to 12 is similar to that disclosed in the preceding figures in that the rear windshield framing element is preformed in its lower marginal edge to provide an inwardly projecting flange 65 adapted to provide a surface for mounting an instrument panel 66. The instrument panel 66 is provided in its upper marginal edge with a rearwardly extending flange 67, which flange is adapted to mate with and be secured to the rearwardly projecting flange 65 formed on the lower marginal edge of the rear windshield framing panel. The extreme marginal edge of the windshield framing panel 50 may be bent downwardly to provide a downwardly projecting flange 67, which flange is adapted to lie rearwardly of the instrument board 66 and provide greater transverse strength and bracing for the windshield framing structure at this point.

It will be appreciated that the foregoing forms of the invention are merely illustrative of the generic inventive concept presented. Many other and further modifications thereof falling within the scope of the invention as defined in the subjoined claims will be clearly apparent to those skilled in the art.

What we claim is:

1. In a windshield construction, a pair of stampings each surrounding and defining a windshield opening, said stampings being each preformed to provide mating flanges in the marginal edges of said windshield openings for securing said stampings together, each of said stampings having a portion adapted to be in the surface of a jam face of a door opening, said last mentioned portions being secured together in overlapping relation to reinforce said jam face.

2. In a windshield framing construction, a pair of stampings each surrounding a windshield opening, said stampings being each preformed to provide mating flanges in the marginal edges of said windshield openings for securing said stampings together, said stampings being provided with upwardly projecting mating flanges in their upper marginal edges whereby a transversely extending header of box section is provided over the windshield openings, said last mentioned upwardly extending mating flanges serving to provide means for positioning a top on said header.

3. In a windshield framing construction, a pair of stampings each surrounding and defining a windshield opening, said stampings being each preformed to provide mating flanges in the marginal edges of said windshield openings for securing said stampings together, means interconnecting said stampings at their upper marginal edges to provide a header of hollow box section above said windshield openings, said interconnecting means serving to provide means for mounting a convertible top in position with respect to said windshield framing.

4. In a windshield framing construction, a pair of stampings, each surrounding and defining a windshield opening, said stampings being preformed in the marginal edges of said windshield openings to provide mating flanges for securing said stampings together, a channel element nested between the upper edges of said stampings having one leg mating with and secured to one of said stampings and having the other leg mating with and secured to the other of said stampings to provide a reinforced header of hollow box section extending transversely over said windshield openings.

5. In a windshield framing construction, a pair of stampings, each surrounding and defining a windshield opening, said stampings being preformed in the marginal edges of said windshield openings to provide mating flanges for securing said stampings together, an upwardly and rearwardly presenting channel element nested between the upper edges of said stampings and having one leg thereof mating with and secured to each, said channel serving to provide means for positioning a top with respect to said windshield framing, said stampings having their marginal edges at the sides of the window opening secured together, whereby to provide a structure of hollow box section at the top and sides of the windshield opening.

6. In a windshield framing construction, a pair of mating sheet metal stampings each surrounding and defining a windshield opening and having their marginal edges at said opening preformed to provide mating flanges for securing said stampings together, a channel member presenting upwardly and rearwardly nested elements between the upper portions of said stampings, said channel having one leg thereof mating with and secured to one of said stampings, and the other leg mating with and secured to the other of said stampings thereby forming a header of closed hollow box section extending over said windshield openings, said channel being adapted to position a top with respect to said windshield framing.

7. In a vehicle body construction, a pair of mating sheet metal stampings adapted to together provide a pillar construction of hollow box section, said pillar defining one side of a windshield opening and one side of a door opening, flanges on said pillar mating and projecting in substantially the plane of said windshield opening and flanges overlapping and joined together to provide a reinforced jam face portion of said door opening.

8. In a vehicle body construction, a pair of mating sheet metal stampings adapted to together provide a pillar construction of hollow box section said pillar defining one side of a windshield opening and one side of a door opening, flanges on said pillar mating and projecting in substantially the plane of said windshield opening and flanges overlapping and joined together to provide a reinforced jam face portion of said door opening, and a sheet metal strip secured over the overlapping flanges in said door opening and having a portion preformed to provide a downwardly extending drip channel at the side of said windshield opening.

9. In a vehicle body construction, a pair of mating sheet metal stampings adapted to together provide a pillar construction of hollow box section, said pillar defining one side of a windshield opening and one side of a door opening, flanges on said pillar mating and projecting in substantially the plane of said windshield opening and flanges overlapping and joined together to provide a reinforced jam face portion of said door opening, and a sheet metal strip secured over the overlapping flanges, said door opening having one marginal edge thereof extending outwardly from and forwardly to provide with said pillar structure a downwardly extending drip channel at the side thereof.

FRED J. WESTROPE.
ALFRED PERSON.